July 4, 1967 R. C. WILLIAMS 3,329,098
EQUALIZING SPRING BOLSTER FOR RAILROAD CARS
Filed Aug. 21, 1964 3 Sheets-Sheet 1
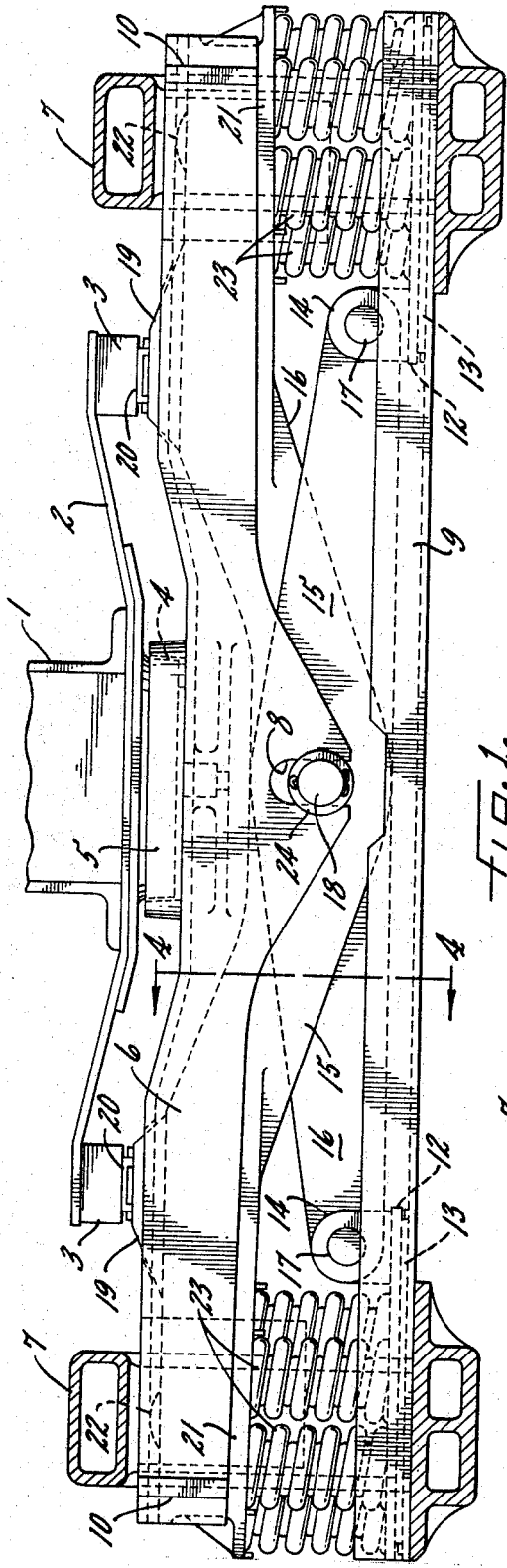
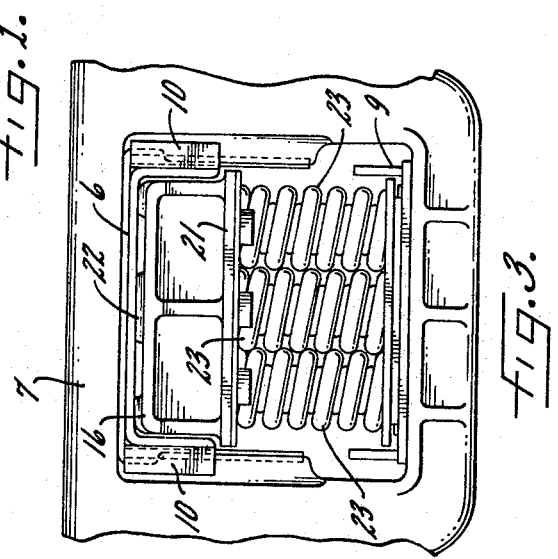
INVENTOR.
Ray C. Williams,
BY Parker & Carter
Attorneys.

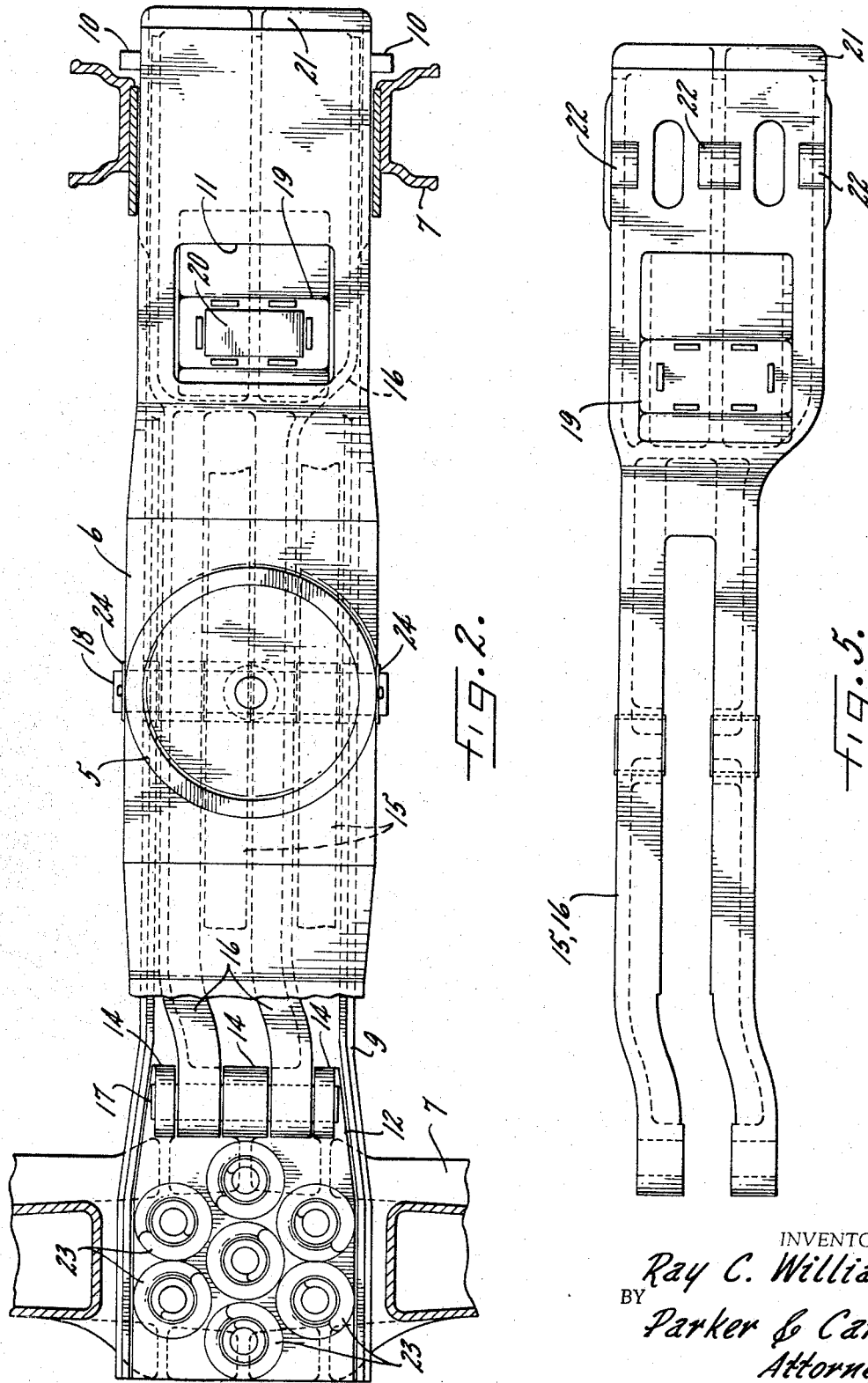

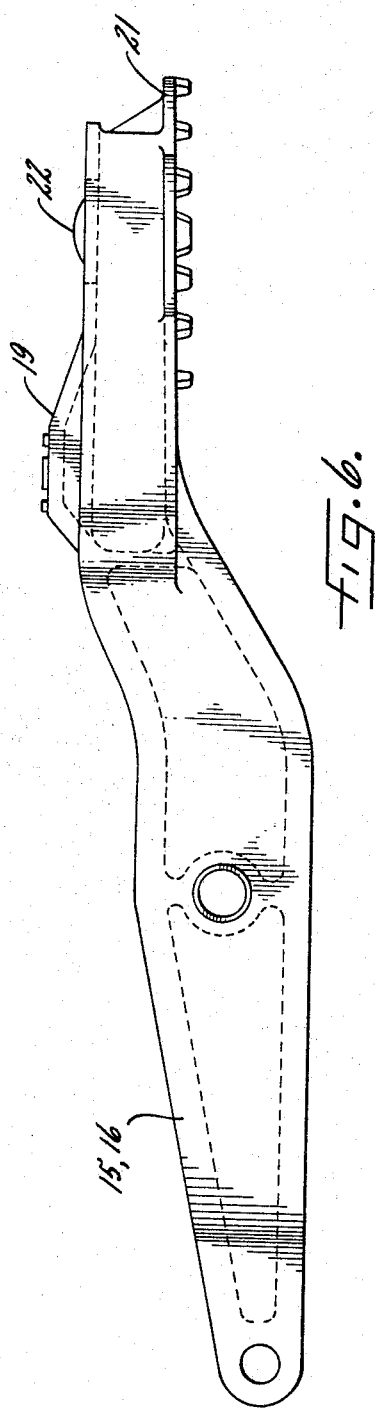

United States Patent Office 3,329,098
Patented July 4, 1967

3,329,098
EQUALIZING SPRING BOLSTER FOR
RAILROAD CARS
Ray C. Williams, Chicago, Ill., assignor to Standard Car
Truck Company, Chicago, Ill., a corporation of Illinois
Filed Aug. 21, 1964, Ser. No. 391,138
5 Claims. (Cl. 105—197)

This invention relates to equalizing bolster for railroad car trucks and has for one object to provide means for providing points of support for the car body on the car truck on both sides of the car widely spaced from the center of gravity.

Another object is to provide means for constraining railroad cars to vertical rectilinear movement with respect to the horizontal plane defined by the two opposed car truck frames supporting the body.

Another object is to provide in connection with the equalizing bolster, spring damping means.

Another object is to so support the car body on the truck that rocking of the car is minimized if not entirely prevented and the car is at all times supported on both sides of its center of gravity.

Another object is to relieve the usual center plate of all vertically applied car load and to cause it to provide a pivot connection only between the car and the truck.

Other objects will appear from time to time throughout the specification and claims.

The invention is illustrated more or less diagrammatically in the accompanying drawings, wherein—

FIGURE 1 is a side elevation;
FIGURE 2 is a plan view;
FIGURE 3 is an end elevation of the equalizing bolster with parts of the side frame included;
FIGURE 4 is a section along the line 4—4 of FIGURE 1;
FIGURE 5 is a detail plan view of one of the scissor bolster elements;
FIGURE 6 is a side elevation of the bolster element.

Like parts are indicated by like characters throughout the specification and drawings:

The center sill of a conventional railroad car body is illustrated diagrammatically at 1. It rests upon the car body bolster 2 which extends laterally on both sides of the car to terminate in body side bearings 3. Depending downwardy from the car bolster is the male body center plate 4 interlocking with the female truck center plate 5 which is carried by a transverse truck transom or bolster 6. The transom bolster 6 extends across the car at each end through the usual side truck frame 7. The transom 6, U-shaped in cross section and downwardly open, is substantially deeper at the center than at the ends and is centrally vertically slotted at 8. A spring plank 9 extends across the truck through the truck frame windows 7 below the transom 6. Removable bolster gibbs 10 project outwardly from each end of the transom outside of the truck frame to maintain the car and associated elements in proper position with respect to the truck frames.

The transom 6 is apertured at 11 near each end, between the center plate and the side frame.

A spring plate 12 rides on each end of the spring plank 9 where it penetrates the truck frame, there being a plate of friction bearing material 13 between them, this bearing material having a specific coefficient of friction as indicated below.

Each spring abutment plate 12 extends inwardly from the truck frame and carries scissor bolster pivot bearing lugs 14. The scissor bolsters 15 and 16 are supported at their lower ends on pivot pins 17 in the abutment plates 12 and extend inwardly and diagonally upward across the truck frame. Where they cross they are joined by the scissors link pin or pivot 18, the latter being held against horizontal transverse movement with respect to the truck body but free to move vertically in the slot 8 in the transom 6.

The scissors bolsters are identical and interchangeable as indicated so that the bolsters may so-to-speak intermesh as shown very clearly in plan view of FIGURE 2.

Load carrying or bearing bosses 19 project upwardly from each scissors bolster through the transverse bolster apertures 11 and carry anti-friction plates 20 to support the side bearings 3. Outwardly beyond the bosses 19 each scissor bolster terminates in a tail 21 which projects with the transom through the window in the car truck contacting the underside of the transom 6 by bosses 22. Load carrying springs 23 are interposed between each bolster tail 21 and an abutment plate 12. Each bolster and the transom are free to travel downwardly in the window as the springs are compressed, the weight of the car is always carried by the scissors bolsters and never by the center plate. No vertical load is placed on the transom and it is free to ride up and down with the bolster tails. The function of the center plate is solely to serve as a pivot connection between the truck and the car bolster, there being no vertical load applied to the plate.

A load applied through the bearings 3 to the scissor bolster bosses 19 causes the two scissors to rotate angularly with respect to one another and to compress the load carrying springs uniformly in both truck frames. This scissors arrangement insures equal downward motion on both sides of the car and the car is supported at two widely spaced points adjacent the outer sides of the car.

When the truck wheels travel over a low spot which tends to tilt the car to one side, increased pressure is applied to the scissors bolsters whose bearing boss is on the down side. This compresses the springs on the down side by moving the bolster tail downwardly but because the scissors bolsters are pivotally interlocked, the same thing happens on the high side and the car as a result moves downwardly along a path perpendicular to the plane of the spring plank and the transverse bolster. The pressure applied to the bearing block on the low side will be greater than the pressure applied to the bearing block on the high side but unless the car tips over, both bearing blocks are still supported by the two scissors bolster bosses.

When pressure is applied to the scissors bolsters causing each bolster tail to move downwardly as the load springs are compressed, the bolster ends tend to move outwardly equally away from the scissors pivot 18. Thus the springs remain vertical and are held in parallel working position perpendicular to their abutments on bolster tail and plate.

The anti-friction plates between the body side bearings and the bearing bosses 19 offer a minimum resistance to relative horizontal angular displacement of body bolster and scissors bolster. The friction plate between the spring plank and the spring plate 13 offers a specific optimum resistance to the longitudinal movement of the spring plate with respect to the spring plank as the scissors tend to collapse. This gives a desired resistance to spring movement to properly damp spring operation.

The resistance between the abutment plate and the spring plank resists this cross-wise motion of the abutment plate and serves to damp out spring movement. The anti-friction member between the bearing blocks and the bolster boss facilitates angular movement of the truck with respect to the car so we have in one case a minimum of friction and in the other case a specific optimum of friction for two quite different purposes.

For convenience the lower scissors bolster ends terminate on the inside of the car truck but the effect would be exactly the same if the lower end of the scissor bolster extended outwardly into the window in the car truck. Under these circumstances it would be necessary to redesign the car truck window to get room for the springs. The disclosed arrangement permits the scissor bolster arrangement to be applied to a conventional car truck.

The two scissors bolsters are each slightly offset so that a single casting may be used, the two castings being merely reversed so one penetrates and interlocks with the other.

The geometry of this structure is important. The two scissors bolsters are pivoted together and their pivot or joint fulcrum is held by the transverse bolster against horizontal transverse movement but is free to move vertically. The pivot pin 18 together with the slot 8 hold the scissor assembly against horizontal movement across the car truck.

When a load is applied to one of the scissors at its upper end, since its lower end across the car cannot move downwardly, held as it is by the car truck frame, the pivot moves down but as it does that, it causes the other scissors end to move down and because the other scissors is supported by the car truck, the inevitable result is that the boss on the other side of the car moves down by substantially the same distance. If, for example, a load is applied sufficient to compress the springs on one side one inch, the scissor pivot moves down one-half inch but the springs under the other scissors bolster also move down approximately one inch. Thus a uniform parallel substantially equal movement of both load bearing elements on the car truck quite independent of any conditions in loading on the two sides of the truck, is assured. Downward movement is always in normal operation perpendicular to the spring plank and up to the time when the car falls off the truck, the position of the load carrying bosses remains substantially level. There may be some slight difference in deflection of the scissors bolsters on each side of the truck because of the release of stored pressure on the high side spring group which might cause some shifting of the scissors spring plank combination relative to the side frame and also because of appreciable yielding of the high side bolster due to the rather high forces necessary to equalize the spring loads on each truck frame. The point is that the arrangement is such as to maintain the car to the maximum possible extent in the vertical position.

I claim:

1. In a railroad car truck, a pair of parallel, spaced, windowed side frames, a spring plank, the ends of which are bottomed in the windows, load carrying springs in the windows, a scissors bolster pivotally supported on each side frame for horizontal movement, extending diagonally upward to rest upon the load carrying springs in the opposite side frame, a transom bolster, the ends of which rest on the spring supported ends of the scissors bolsters, a center plate carried by the transom bolster, the scissors bolsters, where they cross at the center of the truck being pivoted, the transom bolster being vertically slotted to receive the scissors bolster pivot, to permit vertical movement of, while inhibiting horizontal movement thereof, the transom bolster being apertured adjacent the ends thereof, load carrying bosses on the scissors bolsters, near the spring supported ends thereof, projecting through the apertures in the transom bolster, a car bolster having load applying elements adapted to rest upon the load carrying bosses, a center plate on the car bolster interlocking with the center plate on the transom bolster and so spaced that no vertical load can be carried by the center plates.

2. The device of claim 1 characterized by the fact that a spring plate free to move longitudinally thereof is interposed between each plank and the load carrying springs, and extends inwardly from the springs to carry a pivot lug on which the scissors bolster is pivoted.

3. The device of claim 2 characterized by the fact that a high friction bearing material plate is interposed between the spring plank and the spring plate to resist horizontal movement of the plate.

4. The device of claim 1 characterized by the fact that the transom bolster includes downwardly extending vertical flanges, from end to end, to contain the vertical slots to receive the scissors bolster pivot.

5. The device of claim 1 characterized by the fact that the scissors bolsters are bifurcated from their lower ends upwardly beyond the pivot between them, to permit intermeshing at the pivot.

References Cited

UNITED STATES PATENTS

| 1,212,987 | 1/1917 | Morrow | 280—112 |
| 1,237,166 | 8/1917 | Burrmann | 105—203 |
| 2,516,082 | 7/1950 | Spencer | 105—197 X |
| 2,862,459 | 12/1958 | Miller et al. | 105—208.2 X |

FOREIGN PATENTS

| 641,915 | 2/1937 | Germany. |

ARTHUR L. LA POINT, *Primary Examiner.*

H. BELTRAN, *Assistant Examiner.*